(12) United States Patent
Pfister

(10) Patent No.: US 7,709,755 B2
(45) Date of Patent: May 4, 2010

(54) SEALING ELEMENT FOR SEALING A STRAND-SHAPED BODY IN AN APERTURE OF A WALL

(75) Inventor: Martin Pfister, Wiesentheid (DE)

(73) Assignee: Leoni Bordnetz-Systeme GmbH, Nuremberg (DE)

( * ) Notice: Subject to any disclaimer, the term of this patent is extended or adjusted under 35 U.S.C. 154(b) by 242 days.

(21) Appl. No.: 11/854,573

(22) Filed: Sep. 13, 2007

(65) Prior Publication Data

US 2008/0011502 A1    Jan. 17, 2008

Related U.S. Application Data

(63) Continuation of application No. PCT/EP2006/005358, filed on Jun. 6, 2006.

(30) Foreign Application Priority Data

Jun. 4, 2005    (DE) .................. 10 2005 025 780

(51) Int. Cl.
*H02G 3/18* (2006.01)

(52) U.S. Cl. ................ 174/668; 174/650; 174/659; 174/152 G; 174/669; 174/153 G; 16/2.1; 248/56

(58) Field of Classification Search ........... 174/650, 174/659, 662, 665, 668, 669, 135, 152 R, 174/152 G, 153 G, 151, 11 BH, 14 BH; 16/2.1, 16/2.2; 248/56, 49; 277/312, 314, 330, 606; 439/604, 587

See application file for complete search history.

(56) References Cited

U.S. PATENT DOCUMENTS

| 4,626,620 | A | * | 12/1986 | Plyler ................ 174/153 G |
| 4,656,689 | A | | 4/1987 | Dennis |
| 5,270,487 | A | | 12/1993 | Sawamura |
| 5,728,974 | A | | 3/1998 | Kitoh et al. |

FOREIGN PATENT DOCUMENTS

| EP | 1010584 A2 | 6/2000 |
| EP | 1424245 A2 | 6/2004 |
| JP | 8009537 A | 1/1996 |
| JP | 8163747 A | 6/1996 |
| JP | 2005033884 A | 2/2005 |

OTHER PUBLICATIONS

Japanese Office Action dated Apr. 14, 2009.
International Search Report dated Sep. 15, 2006.

* cited by examiner

*Primary Examiner*—Dhiru R Patel
(74) *Attorney, Agent, or Firm*—Laurence A. Greenberg; Werner H. Stemer; Ralph E. Locher

(57) ABSTRACT

A sealing element for sealing a strand-shaped body in an aperture of a wall, in particular for sealing a loom of cables in an aperture of a vehicle-body sheet, has a bush through which the strand-shaped body is guided. The bush has a circumferential wall bounding a cavity. A clamping element for clamping the bush against the aperture reaches with an extension into the cavity. The extension and/or the cavity are of a conical configuration such that, during clamping with the clamping element, the extension is pressed into the cavity, and therefore the circumferential wall is clamped radially against the aperture in the region of the conical configuration.

8 Claims, 2 Drawing Sheets

SEALING ELEMENT FOR SEALING A STRAND-SHAPED BODY IN AN APERTURE OF A WALL

CROSS-REFERENCE TO RELATED APPLICATIONS

This is a continuation, under 35 U.S.C. §120, of copending international application No. PCT/EP2006/005358, filed Jun. 6, 2006, which designated the United States; this application also claims the priority, under 35 U.S.C. §119, of German patent application No. DE 10 2005 025 780.1, filed Jun. 4, 2005; the prior applications are herewith incorporated by reference in their entirety.

BACKGROUND OF THE INVENTION

Field of the Invention

The invention relates to a sealing element for sealing a strand-shaped body in an aperture of a wall, in particular for sealing a loom of cables in an aperture of a vehicle-body sheet, with a bush through which the strand-shaped body is guided.

In general, in particular in the motor vehicle sector, there is the problem of leading a loom of cables in a watertight manner through from a dry region into a wet region, for example from the vehicle interior into the engine compartment in which spray occurs.

Published, non-prosecuted German patent application DE 101 29 086 A1 reveals a wall lead-through which has a bush through which the strand-shaped body is guided. The bush is formed of a molded body which is foamed around the strand-shaped body, and a fastening flange formed as a single piece with the molded body. A sealing lip which encircles the strand-shaped body and, in the final installation state, is pressed against an opening edge of a wall opening is integrally formed on the fastening flange. A two-part insertion part, which is pushed into the fastening flange, is provided to stiffen the fastening flange. Furthermore, a stiffening frame is provided on that side of the opening edge which faces away from the bush. A simple lateral insertion of the strand-shaped body is ensured by an insertion slot leading to the wall opening.

Published, European patent application EP 1 036 711 A2 likewise describes a sealing wall lead-through of a loom of cables through a wall opening in the motor vehicle sector. In this case, a bush of a two-part configuration with a dimensionally stable insert and an elastic bellows is provided. The dimensionally stable insert serves for secure fastening on the vehicle-body sheet, and the bellows in particular takes on the function of protecting against spray water. The two parts are connected in a complicated manner to each other via a mechanical connecting device, and a complicated installation of the bush and accessibility of the vehicle-body sheet from both sides are required.

SUMMARY OF THE INVENTION

It is accordingly an object of the invention to provide a sealing element for sealing a strand-shaped body in an aperture of a wall which overcomes the above-mentioned disadvantages of the prior art devices of this general type, which provides a reliable seal and is formed from few parts and can easily be fitted.

With the foregoing and other objects in view there is provided, in accordance with the invention, a sealing element for sealing a strand-shaped body in an aperture of a wall. The sealing element contains a bush through which the strand-shaped body is guided. The bush has a circumferential wall defining and bounding a cavity. A clamping element is provided for clamping the bush against the aperture. The clamping element has an extension reaching into the cavity. At least one of the extension and the cavity are of a conical design such that, during clamping with the clamping element, the extension is pressed into the cavity, and the circumferential wall is clamped radially against the aperture in a region of the conical design.

According thereto, the sealing element has a bush with a strand-shaped body guided through it. In particular, a watertight lead-through for a loom of cables in the motor vehicle sector is thereby formed. The bush contains a circumferential wall bounding a, in particular, cylindrical cavity. A clamping element is provided for clamping the bush against the aperture and, in the process, the bush, in particular the circumferential wall, expands during the clamping. The circumferential wall is thereby pressed radially outward against an opening edge of the aperture.

A substantial advantage of the configuration is to be seen in the fact that particularly reliable and permanent sealing is ensured by the bush being pressed and clamped against the aperture. The bush is inserted into the aperture and, with the aid of compressive forces which are directed in such a manner that they cause radial expansion of the bush, expands and very readily seals the points of contact between it and the wall.

In order to permit simple expansion and reliable and permanent sealing, the bush is formed from an elastic material, in particular from a foam material, such as PU foam. The strand-shaped body is formed, in particular, by casting or foaming a sealing material around or spraying it onto a bunch of cables. In these methods, the sealing material is transferred from a liquid or viscous state into a more solid state. The bunch of cables may also be encased in a watertight manner with a rubbery material. In particular, PU foam, a PU casting compound or a caoutchouc or rubber compound or a "hot-melt" are appropriate as the casting and sealing material. The watertight surround around the body is preferably part of the bush which is configured as a single-piece molded body.

The, in particular cylindrical, cavity formed in the bush has a positive effect on the flexibility of the bush. A cavity which is open toward the clamping element affords the possibility of allowing the compressive forces on the inside to act outward along the circumferential wall. An increased compressive effect in the radial direction, or a more effective expansion of the bush is therefore obtained. The presence of a cavity in the bush increases the flexibility of the bush. The cavity is preferably formed as an oval, in particular circular, cylinder. A circular cylinder formed by the circumferential wall has the advantage that, because of the symmetrical geometry, the material expands uniformly under the action of the compressive forces and therefore the stress concentration of the forces is reduced.

For the expansion of the bush, the clamping element has an extension which, in order to expand the bush, engages in the cavity of the bush. The extension is configured and dimensioned in such a manner that, after insertion into the cavity, it presses at least against part of the circumferential wall. Pressing of the bush over a large area in the radial direction is the most effective.

Furthermore, to expand the bush, the cylindrical cavity is of a convergent or conical configuration, as viewed in the axial direction from the clamping element. As an alternative or in addition, the extension is also of a convergent or conical configuration. In this case, a similarly convergent shape of the circumferential wall, as viewed from the clamping element, is not absolutely required. In order to form a convergent cavity, it suffices if the thickness of the circumferential wall increases progressively and continuously such that the inside of the circumferential wall forms a cone. An inside of conical design increases that surface of the circumferential wall on which the pressure produced by the clamping element, in particular by the extension of the clamping element, acts. In view of the vectorial character of the forces, a circumferential-wall inside which is inclined in relation to the axis of rotation of the bush has a further advantage: since the vectorial force during the pressing operation is formed of both an axial and a radial component, a force action in the radial direction is automatically produced.

In order to obtain a particularly effective interaction between the extension and the circumferential wall of the bush and therefore to increase the forces in the radial direction, the dimensions and shape of the extension are matched, in particular to the dimensions and shape of the cavity. As a result, the extension can be placed onto the entire inner surface of the circumferential wall and can therefore act over a large area of the circumferential wall. The diameter of the cone point of the extension is, in particular somewhat larger than the diameter at the cone base of the cavity and, at the same time, the cavity and the extension have identical cone angles such that, when the extension is introduced into the cavity, a radial expansion of the bush is caused.

In order to obtain the greatest possible stability of the connection between the sealing element and the wall, the bush preferably has a collar for placing onto an opening edge of the aperture. The high degree of dimensional stability ensures that the collar of the bush bears in a watertight manner against the opening edge in all of the regions around the aperture. A further advantage of this configuration is that the bush has a diameter, which is larger than the diameter of the aperture, only in the region of the collar. It is therefore not required for the bush to engage behind the opening edge but rather the bush is merely placed into the aperture and fastened at the collar by the clamping element to the wall.

A further substantial advantage of this configuration is that, in order to fasten the sealing element after leading it through the aperture, access is only required on one side of the vehicle-body sheet. In this case, the bush is inserted into the aperture and is clamped on the one side of the wall by a clamping element. Access to the opposite side of the wall is not absolutely necessary.

A further preferred feature of the sealing element is that the clamping element in particular covers the entire collar of the bush. This first prevents the production of points between the collar and the opening edge which are not watertight. Second, complete covering of the collar by the clamping element ensures uniform distribution of the compressive forces.

Furthermore, the clamping element preferably has a holding element for holding the bush on the clamping element. As a result, the bush and the clamping element can still be assembled captively before being fixed to the wall and can be considered and used as a single-piece installation unit forming the sealing element.

Expediently, the clamping element has a spacer in the direction of the bush. The clamping element is supported in the fitted state by the spacer on the wall.

In order to simplify installation, the spacer is preferably configured as a guide sleeve for the leading through of a fastening element. The fastening element is configured, in particular, as a screw or as a screw bolt. By use of a plurality of screws, a very stable frictional connection can be obtained between the sealing element and the wall with which the bush is pressed in a watertight manner against the opening edge around the aperture. Instead of the screw connection, other connections are also possible, for example a rivet connection or a form-fitting connection via, for example, a bayonet-type fastening.

The length of the spacer in the axial direction is advantageously shorter than the corresponding length of the extension. The extension therefore extends over the aperture towards the opposite side of the wall. When it is pulled in, it presses the bush in the radial direction and causes an expansion of the bush before the axial displacement of the extension is limited by the stop. In the process, the circumferential wall of the bush is pressed against the wall and therefore ensures reliable and effective sealing of the aperture.

Other features which are considered as characteristic for the invention are set forth in the appended claims.

Although the invention is illustrated and described herein as embodied in a sealing element for sealing a strand-shaped body in an aperture of a wall, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
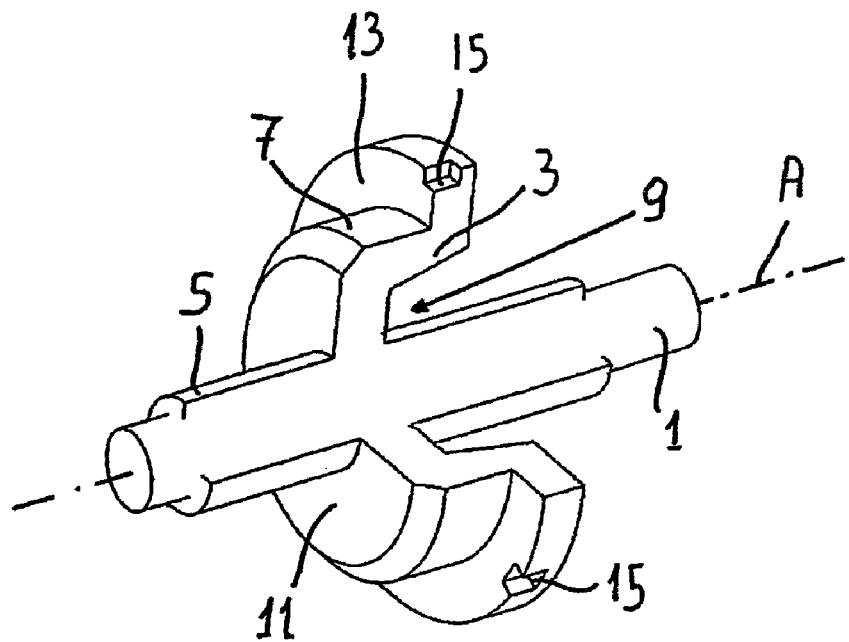
FIG. 1 is a diagrammatic, perspective, partially cutaway view of a stand-shaped body with a bush according to the invention.

In the figures, parts which act in an identical manner are provided with the same reference numbers. Referring now to the figures of the drawing in detail and first, particularly, to FIG. 1 thereof, there is shown a strand-shaped body 1 with an integrally formed bush 3 and a guide 5. The strand-shaped body 1 is, in particular, a bunch of cables encased by PU foam and, together with the bush 3 and the guide 5, forms part of a loom of cables. The bush 3 and the guide 5 are formed as a single piece.

The bush 3 has a circumferential wall 7 which bounds a cavity 9 in the form of a circular cylinder with an axis of rotation A. The cavity 9 is open on one side and the opposite side has a wall 11. The cavity 9 is of a convergent configuration in a direction of the wall 11. A collar 13 is formed around the circumferential wall 7. Depressions 15 are provided in the collar 13.

When the PU foam is foamed around the bunch of cables, the foamable material penetrates the intermediate spaces between the individual lines of the bunch of cables and seals the intermediate spaces in a watertight manner. As a result, a capillary effect cannot occur, and the loom of cables is watertight longitudinally.

Figure 2:
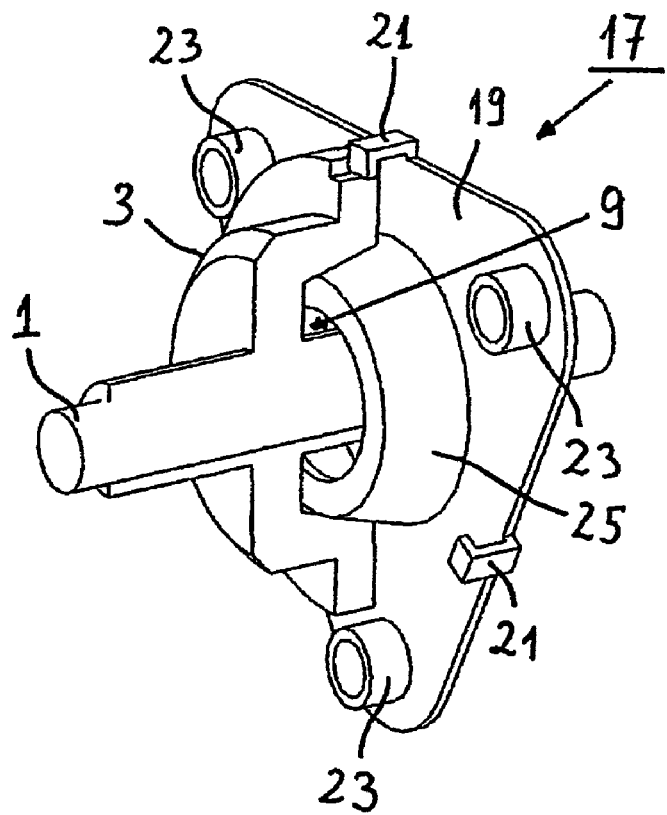
FIG. 2 is a diagrammatic, perspective, partial view of a sealing element, containing a clamping element and the bush according to FIG. 1 fastened thereto.

FIG. 2 shows a sealing element 17, containing a clamping element 19 and the bush 3 fastened thereto. The clamping element 19 has holding elements 21 which engage in the depressions 15 according to FIG. 1 and, in the exemplary embodiment, form a form-fitting connection in the manner of a bayonet-type fastening between the clamping element 19 and the bush 3. The clamping element 19 has a triangular shape with rounded corners. Spacers 23 configured as guide sleeves are fitted in the region of the corners. The clamping element 19 furthermore has an extension 25 which is configured in the manner of a conical hollow cylinder and through which the strand-shaped body 1 is guided. The size of the extension 25 is matched to the size of the cavity 9 of the bush 3.

Figure 3A:
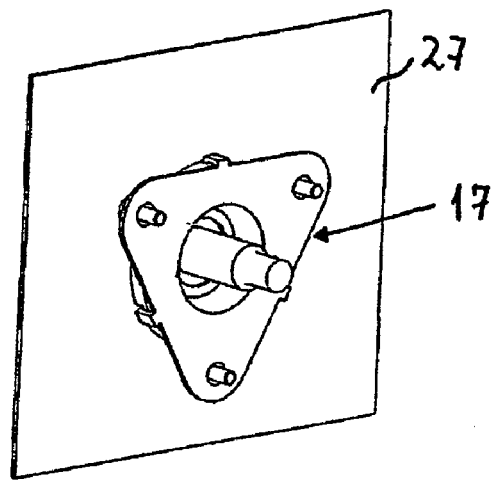
FIG. 3A is a diagrammatic, perspective view of the sealing element shown in FIG. 3.
Figure 3:
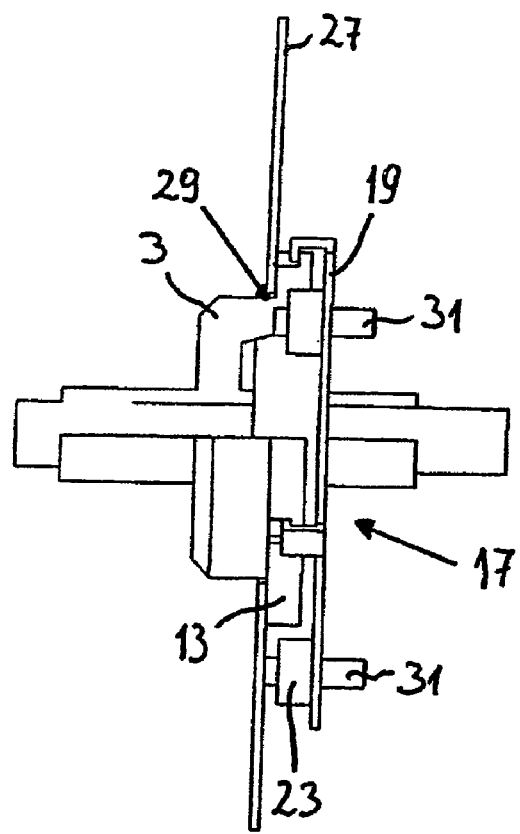
FIG. 3 is a diagrammatic, partial longitudinal section view as seen from a side of the sealing element according to FIG. 2, which is inserted into an aperture.
Figure 4:
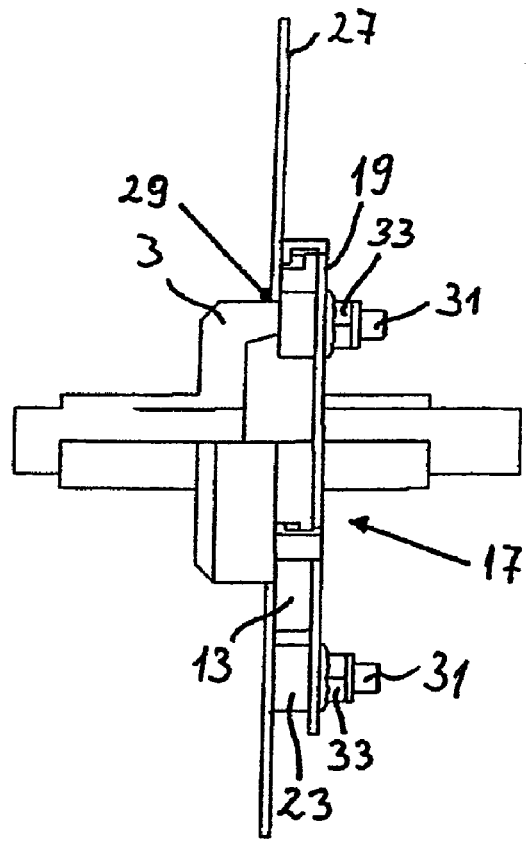
FIG. 4 is a diagrammatic sectional view of the sealing element, which is shown in FIG. 3 in the fitted state.

FIGS. 3, 3A and 4 illustrate two installation steps for installing the sealing element 17 on a wall 27. The wall 27 has an aperture 29 with a circular cross section, into which the bush 3 is placed. The wall 27 also has, in the vicinity of the aperture 29, three fastening elements 31 which are configured, in particular as screw bolts.

During installation, the bush 3 is inserted into the aperture 29 from one installation side. In the process, the fastening elements 31 are guided by the spacers 23 of the clamping element 19. The bush 3 is inserted into the aperture 29 until the collar 13 rests in a watertight manner around the aperture 29. During the installation step according to FIG. 3, the collar 13 is placed on but the clamping element 19 is not yet screwed to the wall 27.

FIG. 3A once again illustrates the sealing element 17 fitted on the wall 27, in a perspective view.

FIG. 4 illustrates the situation in which the clamping element is screwed by screw nuts 33 to the fastening elements 31. The screw nuts 33 are tightened during the screwing operation until the spacers 23 are supported on the wall 27. Since the extension 25 is longer than the spacers 23, it is pushed further into the cavity 9 and causes a radial expansion of the circumferential wall 7. The circumferential wall 7 is pressed in the process fixedly against the wall 27 and therefore seals the contact points. In addition, the extension 25 prevents the elastic material of the circumferential wall 7 from springing back.

This simple installation and secure fastening by frictional connections ensure particularly good sealing of the aperture 29 and therefore a permanent and trouble free use of the sealing element 17.

I claim:

1. A sealing element for sealing a strand-shaped body in an aperture of a wall, the sealing element comprising:
   a bush through which the strand-shaped body is guided, said bush having a circumferential wall defining and bounding a cavity; and
   a clamping element for clamping said bush against the aperture, said clamping element having an extension reaching into said cavity, at least one of said extension and said cavity being of a conical design such that, during clamping with said clamping element, said extension being pressed into said cavity, said circumferential wall being clamped radially against the aperture in a region of said conical design, said clamping element having a holding element for holding said bush on said clamping element.

2. The sealing element according to claim 1, wherein said bush has a collar for fitting onto an opening edge of the aperture.

3. The sealing element according to claim 2, wherein said clamping element covers said collar of said bush.

4. The sealing element according to claim 1, wherein the strand-shaped body is a loom of cables disposed in an aperture of a vehicle-body sheet.

5. A sealing element for sealing a strand-shaped body in an aperture of a wall, the sealing element comprising:
   a bush through which the strand-shaped body is guided, said bush having a circumferential wall defining and bounding a cavity; and
   a clamping element for clamping said bush against the aperture, said clamping element having an extension reaching into said cavity, at least one of said extension and said cavity being of a conical design such that, during clamping with said clamping element, said extension being pressed into said cavity, said circumferential wall being clamped radially against the aperture in a region of said conical design, said clamping element having a spacer in a direction of said bush.

6. The sealing element according to claim 5, wherein said spacer is a guide sleeve for a leading-through of a fastening element.

7. The sealing element according to claim 5, wherein said spacer has a length in an axial direction being shorter than a corresponding length of said extension.

8. The sealing element according to claim 5, wherein said the bush is formed of an elastic material and said clamping element is formed of a dimensionally stable material.

* * * * *